No. 732,675. PATENTED JUNE 30, 1903.
J. O'C. COCHRAN.
FORK.
APPLICATION FILED NOV. 14, 1902.
NO MODEL.

No. 732,675. Patented June 30, 1903.

UNITED STATES PATENT OFFICE.

JOHN O'CONNOR COCHRAN, OF WILMINGTON, DELAWARE, ASSIGNOR OF ONE-HALF TO MATTHEW K. KELTER, OF WILMINGTON, DELAWARE.

FORK.

SPECIFICATION forming part of Letters Patent No. 732,675, dated June 30, 1903.

Application filed November 14, 1902. Serial No. 131,348. (No model.)

*To all whom it may concern:*

Be it known that I, JOHN O'CONNOR COCHRAN, a citizen of the United States, residing at Wilmington, in the county of Newcastle and State of Delaware, have invented certain new and useful Improvements in Forks, of which the following is a specification.

My invention relates to improvements in forks; and one object of my invention is the provision of a fork which is particularly adapted for lifting meat from a pot or boiler or from an oven without danger of the meat spilling or becoming detached from the fork, as would be the case in using an ordinary fork.

Another object of my invention is the provision of a fork which will be particularly efficient in handling a roast or fowl, as it will permit the turning of the roast or fowl bodily to the most convenient position for carving.

Another object of my invention is the provision of a fork which will be durable and simple of construction, inexpensive of production, and entirely efficient and practical in every respect.

To attain the desired objects, my invention consists of a fork embodying novel features of construction and combination of parts, substantially as disclosed herein.

Figure 1:
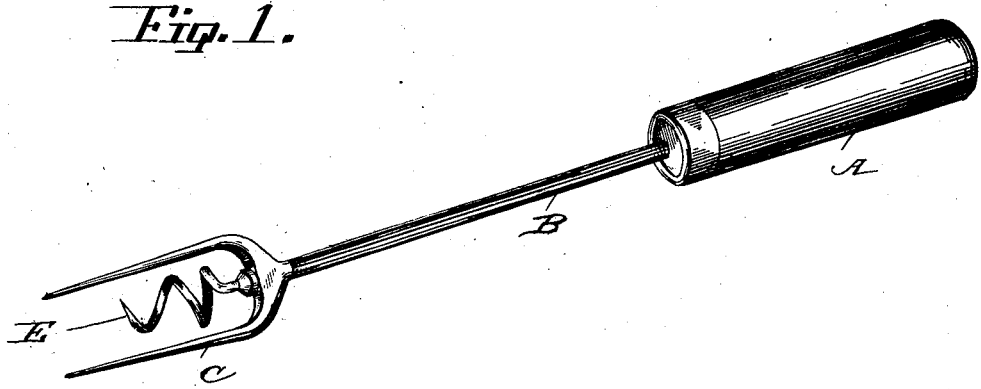
Figure 2:
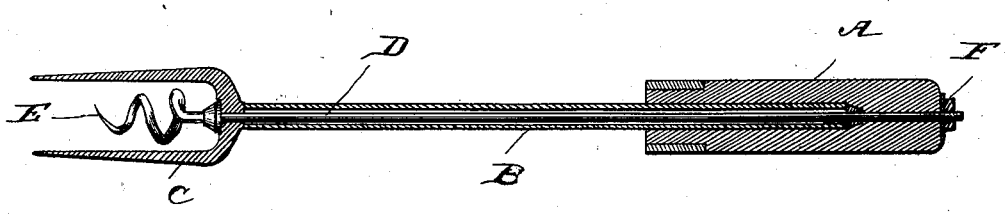

Figure 1 represents a perspective view of my novel fork, and Fig. 2 represents a central sectional view.

My fork is of extremely simple construction and comprises the handle or grasping portion A, the tube or sleeve B, fitting in the handle, the tines C, mounted upon the outer end of the tube, the rod D, passing through the tube and handle and carrying at one end the spiral screw E and at the other end secured by the nut F to cause the screw to revolve with the handle.

In operation the tines are driven into the meat to the proper distance, and the handle is then turned to cause the spiral screw to engage or twist into the meat, giving a firm and reliable connection between the fork and the meat and permitting the removal of the meat bodily without danger of spilling or detachment of the meat from the fork, and to remove the fork it is simply necessary to release the screw by turning the handle in the reverse direction, which permits the withdrawal of the fork.

The advantages of my fork will be readily apparent, and it will be noticed that a piece of meat or a fowl of any size can be handled with great ease without fear of tearing the meat or of dropping the same.

I claim—

1. A fork consisting of the tines, the handle, a sleeve connected with the tines and handle and the spiral screw arranged between the tines and operated by the handle.

2. A fork consisting of a handle, a spiral screw adapted to be revolved by the handle, and a pair of tines operating conjointly with the spiral screw.

3. A fork consisting of the tines, a hollow sleeve connected with the tines, a handle mounted to revolve upon the sleeve, and a spiral screw connected with the handle and revolved thereby to operate in conjunction with the tines.

4. In a fork, the combination of the rigid tines, a rotatable device for engaging the meat to secure it upon the tines, and a handle for operating the rotatable securing device.

In testimony whereof I affix my signature in presence of two witnesses.

JOHN O'CONNOR COCHRAN.

Witnesses:
MOSES WEIL,
JOHN F. LYNN.